US011915590B2

(12) United States Patent
Bigoness et al.

(10) Patent No.: US 11,915,590 B2
(45) Date of Patent: Feb. 27, 2024

(54) "A" PILLAR DETECTION SYSTEM

(71) Applicant: GENTEX CORPORATION, Zeeland, MI (US)

(72) Inventors: Eric P. Bigoness, Ada, MI (US); Bradley A. Bosma, Hudsonville, MI (US); Jeremy A. Schut, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 17/740,702

(22) Filed: May 10, 2022

(65) Prior Publication Data

US 2022/0366789 A1 Nov. 17, 2022

Related U.S. Application Data

(60) Provisional application No. 63/187,066, filed on May 11, 2021.

(51) Int. Cl.
*G08G 1/16* (2006.01)

(52) U.S. Cl.
CPC .................................... *G08G 1/16* (2013.01)

(58) Field of Classification Search
None
See application file for complete search history.

(56) References Cited

U.S. PATENT DOCUMENTS

2006/0184297 A1* 8/2006 Higgins-Luthman ........................ G06V 20/58 701/41
2011/0090073 A1 4/2011 Ozaki
2015/0336511 A1 11/2015 Ukeda
2016/0144785 A1 5/2016 Shimizu et al.
2018/0122241 A1 5/2018 Canella et al.
2018/0208112 A1* 7/2018 Tayama .................... B60Q 5/00
2018/0227411 A1* 8/2018 Wang ....................... G06F 3/167
2021/0188259 A1* 6/2021 Kim ....................... B60W 10/20
2021/0261059 A1* 8/2021 Baur ........................... B60R 1/08
2021/0263518 A1* 8/2021 Sheng .................... G01S 13/931
2021/0383700 A1* 12/2021 Fukui ...................... G08G 1/005

FOREIGN PATENT DOCUMENTS

KR 1020190031057 A 3/2019

OTHER PUBLICATIONS

International Search Report dated Sep. 5, 2022, for corresponding PCT application No. PCT/US2022/028491, 3 pages.
Written Opinion dated Sep. 5, 2022, for corresponding PCT application No. PCT/US2022/028491, 7 pages.

* cited by examiner

*Primary Examiner* — John F Mortell
(74) *Attorney, Agent, or Firm* — Price Heneveld LLP; Brian James Brewer

(57) ABSTRACT

A warning system for a vehicle may comprise at least one imager disposed to capture image data from a scene in a blind spot of a vehicle; a processor associated with the imager and configured to process the image data and determine whether there may be an obstruction in the blind spot; and a controller in communication with the processor. The processor may be configured to determine whether the obstruction in the blind spot may be a person and, upon a determination that the obstruction is a person, sends an appropriate input to the controller. The controller may be configured to, upon receipt of the input indicating that there may be a person in the blind spot, cause an alert to be generated.

19 Claims, 3 Drawing Sheets

"A" PILLAR DETECTION SYSTEM

CROSS REFERENCE TO RELATED APPLICATIONS

This application claims the benefit of and priority to U.S. Provisional Patent Application No. 63/187,066, filed on May 11, 2021, entitled ""A" Pillar Detection System," the entire disclosure of which is hereby incorporated herein by reference.

FIELD OF THE DISCLOSURE

This disclosure relates generally warning systems on vehicles, and in particular, to warning systems for people in blind spots of vehicles.

BACKGROUND

Pedestrians and cyclists can disappear behind an "A" pillar of a vehicle, creating a hazardous condition. This may be especially problematic at low speeds or at intersections as pedestrians or cyclists can then be in the blind spots for longer periods of time.

SUMMARY

According to an aspect, a warning system for a vehicle may comprise at least one imager disposed on a vehicle surface and configured to capture image data from a scene in a blind spot of a vehicle; a processor in communication with the imager and configured to process the image data and determine whether there is an obstruction in the blind spot; a controller in communication with the processor; at least one of an accelerometer in communication with the controller and a communication link between a CAN bus of the vehicle and the controller, wherein the controller is configured to determine whether the vehicle is moving in a forward direction based on an input received from one of the can bus of the vehicle and the controller. The processor may be configured to send, upon a determination that there is an obstruction in the blind spot, an appropriate input to the controller.

According to an aspect, a warning system for a vehicle may comprise at least one imager disposed to capture image data from a scene in a blind spot of a vehicle; a processor associated with the imager and configured to process the image data and determine whether there may be an obstruction in the blind spot; and a controller in communication with the processor.

The processor may be configured to send, upon a determination that there is an obstruction in the blind spot, an appropriate input to the controller; and the controller may be configured to, upon receipt of the input indicating that there is an obstruction in the blind spot, cause an alert to be generated by at least one of a visual alert element and an auditory alert element. The processor may be configured to determine whether the obstruction in the blind spot is a person and, upon a determination that the obstruction is a person, send an appropriate input to the controller. The controller may be configured to, upon receipt of the input indicating that there may be a person in the blind spot, cause an alert to be generated. The alert may be a visual alert generated by the visual alert element, and the visual alert element may comprise a light source configured to display a light. The alert may be an auditory alert and the inputs may cause the generation of an auditory alert by the auditory alert element.

The warning system may comprise both a light source configured to activate a light when an object is detected in a field of view of the imager and a speaker configured to emit an audible signal upon receipt of an input from the controller indicating that an object may be detected in the field of view of the imager.

In some embodiments, the warning system may comprise a tiered series of alerts, with a first alert being generated upon the detection of an obstruction in the blind spot at a first point in time when the vehicle 10 is determined to be moving in a forward direction. A second alert may be generated at a second point in time later than the first point in time upon a determination that the vehicle is still moving and the obstruction is still present; and no second alert may be generated at the second point in time if the vehicle has stopped moving in the forward direction.

The warning system further may comprise a user interface in communication with the controller and may comprise at least one user input element. The controller may be configured to, upon the receipt of a particular input from the user interface, selectively disable the generation of the alert.

DETAILED DESCRIPTION

Figure 1:
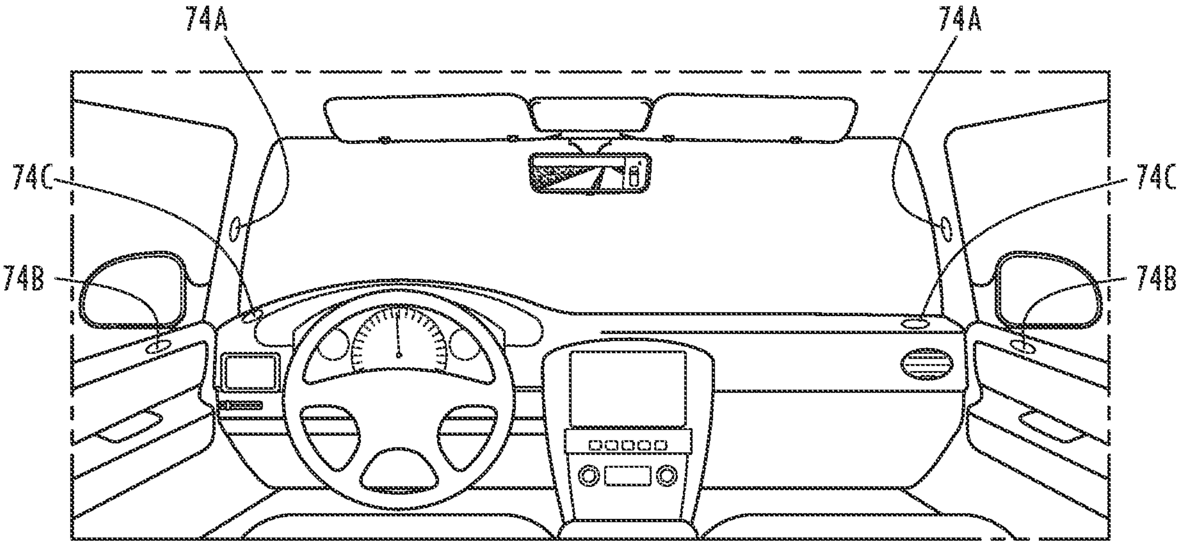
FIG. 1 illustrates forward blind spots for a driver of a vehicle.

Referring to FIG. 1, a driver of a vehicle, generally shown at 10, may have a front field of view 16 of the surroundings to the exterior of vehicle 10. However, vehicles 10 may have structural elements, such as exterior sideview mirrors 18 or pairs of pillars 20, that block portions of the driver's field of view 16, thereby causing blind spots 24. The front-most pair of pillars of a vehicle 10 generally extend on either side of a vehicle windshield 28 and connect to a roof 32 of vehicle 10, and are generally referred to as the A pillars. The A pillars 20 may each create a blind spot 24 for drivers. In addition, exterior sideview mirrors 18 may block portions of a driver's field of view 16.

Figure 2:
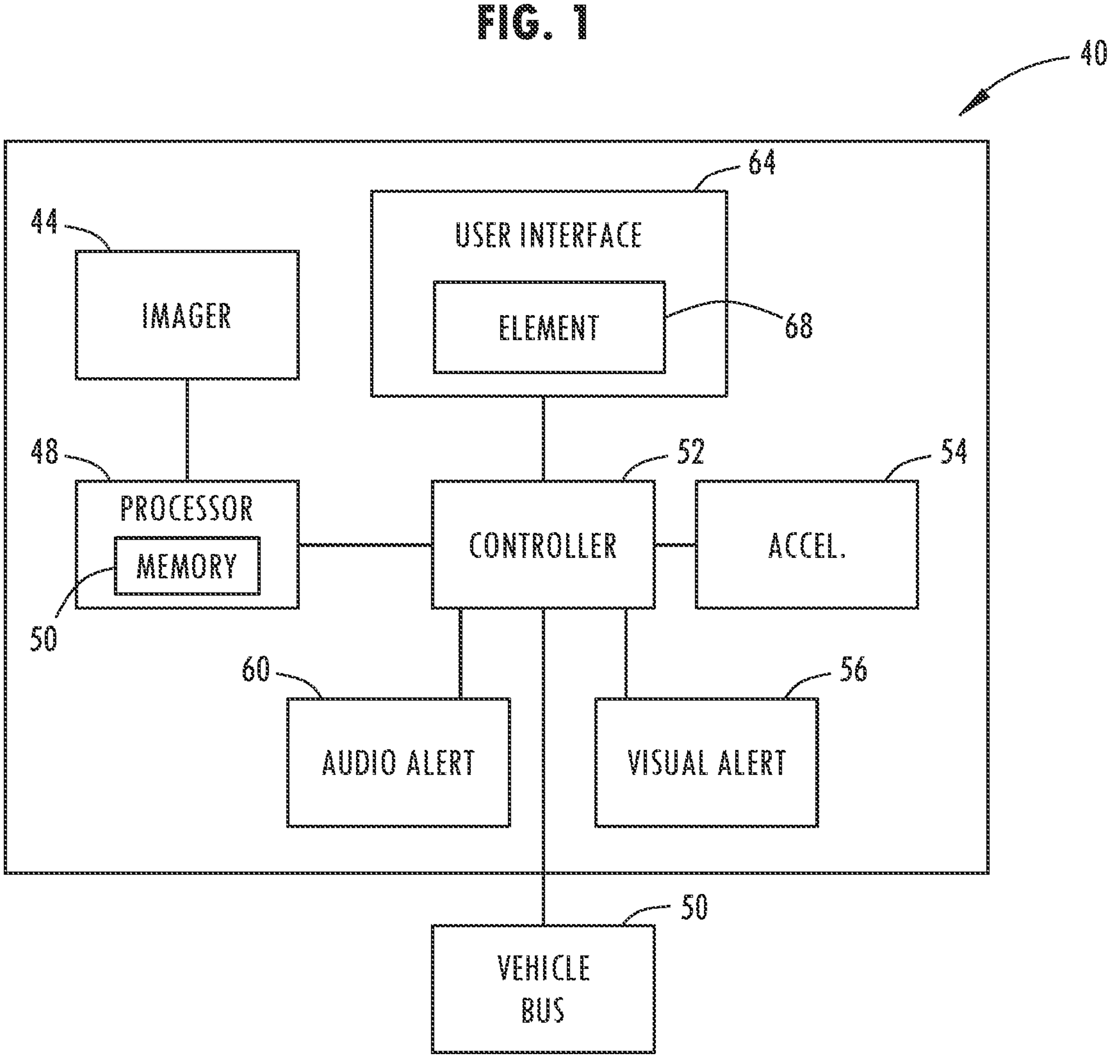
FIG. 2 illustrates a block diagram of the warning system in accordance with this disclosure.

A warning system 40 to alert the driver to obstructions, especially people such as pedestrians and cyclists, that may be partially or completely hidden by the A pillars 20 is illustrated in FIG. 2. Warning system 40 may comprise at least one imager 44, at least one processor 48, and at least controller 52. Warning system 40 may further comprise at least one visual alert element 56 and/or auditory alert element 60. In some embodiments, warning system 40 may comprise a user interface 64 with at least one user input element 68. In some embodiments, warning system 40 may be in communication with a vehicle CAN bus 50. In some embodiments, warning system 40 may further comprise an accelerometer 54.

Figure 3:
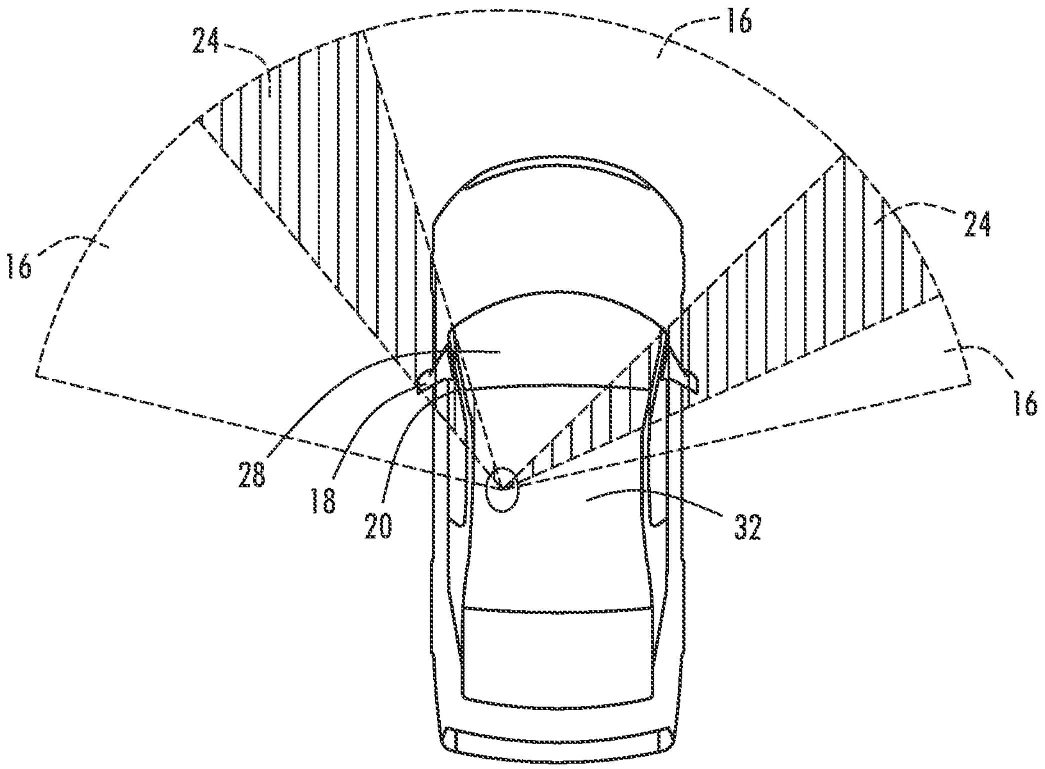
FIG. 3 illustrates fields of view of imagers disposed on a vehicle in accordance with this disclosure.

The at least one imager 44 may include a lens (not shown) and an image sensor (not shown) such as a complementary metal-oxide-semiconductor ("CMOS") that can create image data when activated. As shown in FIG. 3, imager 44 may have a field of view 72 that partially or completely overlaps with blind spots 24 created by A pillars 20 of vehicle 10. Imager 44 may be configured to capture images in the imager field of view 72 and to send image data from the captured images to processor 48 for processing.

Imager 44 may be disposed on or in vehicle 10. For example, imager 44 may be disposed within a housing of an exterior rearview mirror, within an A pillar 20, behind a fender of vehicle 10, or other suitable location. An opening (not shown) such as an opening in the housing of the exterior rearview mirror, an opening in the A pillar 20, or an opening in the fender of the vehicle 10, may be defined by the vehicle 10, thereby allowing imager 44 to capture images while being unobtrusive. Placing imager 44 in an A pillar 20, an exterior rearview mirror, or behind a fender of vehicle 10 may also allow imager 44 to be protected from precipitation, road debris, and the like.

In some embodiments, two imagers 44 may be disposed on vehicle 10, one imager 44 on each side of vehicle 10, and a third imager 44 may be disposed on the front of vehicle 10. In some embodiments, especially in vehicles having raised hoods, such as some pick-up trucks or sport utility vehicles, drivers may have difficulty seeing obstructions, such as small children or animals, that are directly in front of vehicle 10 but below the driver's field of view. Placing an imager in a location to capture the lower portion of the scene in front of vehicle may be advantageous.

In some embodiments, imager 44 and processor 48 may be a single integrated unit. In some embodiments, processor 48 may be a separate component from imager 44 and may be in communication with imager 44. Processor 48 may be configured to process image data from the captured images and determine whether there is an obstruction in one of the blind spots 24. Processor 48 may further be configured to determine whether the obstruction is a person, such as a pedestrian or bicyclist. Upon a determination that the obstruction is a person, processor 48 may convey the determination to controller 52.

Upon a determination that there is an obstruction, such as a person, in a blind spot 24, processor 48 may further be configured to determine the distance between a detected obstruction and vehicle 10, and/or to determine whether the obstruction is beyond a predetermined distance from vehicle 10. Processor may relay the distance information to controller 52. Processor 48 may be configured to ignore detected obstructions that are greater than the predetermined distance away from vehicle 10. This may prevent warning system 40 from generating alerts too frequently and may prevent nuisance alerts.

In some embodiments, processor 48 may include various types of control circuitry, digital and/or analog, and may include a microprocessor, microcontroller, application-specific integrated circuit (ASIC), graphics processing unit (GPU), or other circuitry configured to perform various input/output, control, and other functions.

In some embodiments, processor 48 may be configured to distinguish between image data from the captured images representing people and image data representing other obstructions. Upon a determination that an obstruction detected in the image data represents a person, processor 48 may be configured to transmit an input to controller 52. Processor may be configured to ignore obstructions that are not people.

Controller 52 may be configured to, upon receipt of an input from processor 48 that an obstruction has been detected in the imager field of view 72, cause an alert to be generated. In some embodiments, controller 52 may be configured to cause an alert to be generated only upon a determination that there is an obstruction in the blind spot 24 and that the obstruction is a person. In some embodiments, controller 52 may be configured to cause an alert to be generated only upon a determination that there is an obstruction in the blind spot 24 within a predetermined distance from vehicle 10. In some embodiments, controller 52 may be configured to cause an alert to be generated upon a determination that there is an obstruction in the blind spot 24, the obstruction is a person, and the person is within a predetermined distance from vehicle 10.

In some embodiments, controller 52 may be in communication with a CAN bus 50 of vehicle 10. Controller 52 may be configured to determine whether vehicle 10 is moving in a forward direction based on inputs received from CAN bus 50. Controller 52 may be configured to cause an alert to be generated based on the presence of an obstruction only if vehicle 10 is moving in a forward direction.

In some embodiments, system 40 may further comprise an accelerometer 54 capable of determining whether vehicle 10 is moving in a forward direction. Controller 52 may cause an alert to be generated upon the determination that there is an obstruction in the blind spot 24 only if vehicle 10 is moving in a forward direction.

In some embodiments, controller 52 may be configured to use data from accelerometer 54 to determine vehicle speed. In some embodiments, system 40 may be in communication with a vehicle system that determines how fast the vehicle is traveling. System 40 may be configured to stop generating alerts when the speed of travel of vehicle 10 is travel faster than a predetermined speed. For example, alerts may be enabled, or the system may be enabled, when vehicle 10 is traveling less than 20 miles per hour. Alerts, or the system, may be disabled when the vehicle speed is faster than 20 miles per hour. This may reduce the occurrence of nuisance alerts.

In some embodiments, controller 52 may include various types of control circuitry, digital and/or analog, and may include a microprocessor, microcontroller, application-specific integrated circuit (ASIC), graphics processing unit (GPU), or other circuitry configured to perform various input/output, control, and other functions. In some embodiments, controller 52 may be a system on a chip (SoC). Controller 52 may include one or more modules and other data in memory 50 for carrying out and/or facilitating the operations and functionalities of controller 52. The memory may be configured to operate, store algorithms and data during processing, and execution instructions.

Upon the detection of an obstruction, such as a person, in the imager field of view 72, controller 52 may transmit instructions to at least one of visual alert element 56 and auditory alert element 60. The instructions may cause the generation of an alert from visual alert element 56 and/or auditory alert element 60.

Visual alert element 56 may comprise a light source (not shown). Light source may be disposed on a printed circuit board (not shown) and may be disposed to, when illuminated, shine through a transparent or translucent covering (not shown) on a vehicle surface. In some embodiments, upon the receipt of instructions to activate, light source may be configured to shine constantly. In some embodiments, upon the receipt of instructions to activate, light source may be configured to shine intermittently.

Figure 4:
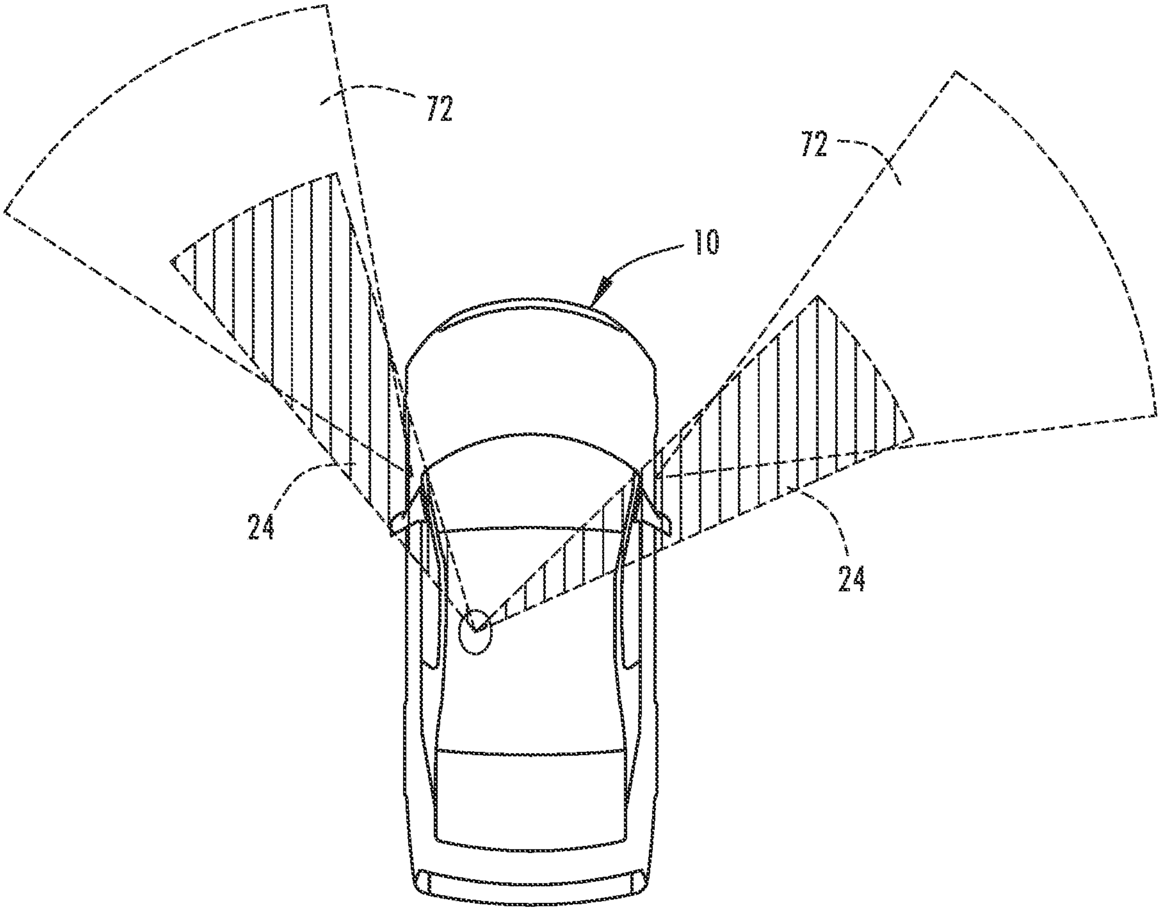
FIG. 4 illustrates potential locations for visual alerts in accordance with this disclosure.
Figure 5:
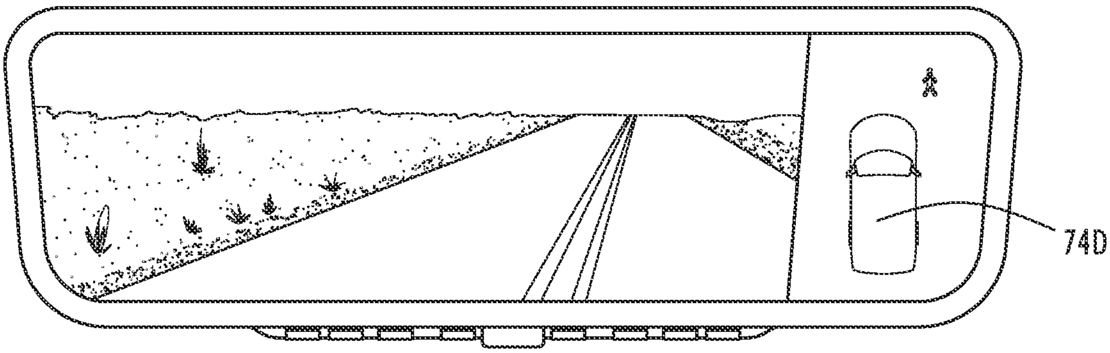
FIG. 5 illustrates a visual alert displayed on a rearview assembly in accordance with this disclosure.

When visual alert has been activated by an input from controller 52, light source may be disposed so as to provide a visual alert in a high visibility area 74 within the vehicle cabin, such as on A pillar 74A, on an interior surface of the door 74B, on a dashboard 74C, or on a rearview display assembly 74D as shown in FIGS. 4 and 5.

In some embodiments, visual alert element 56 may be configured to activate light source upon the receipt of an input from controller 52. In some embodiments, controller 52 may transmit the input to visual alert element 56 upon a determination that an obstruction has been detected in the imager field of view 72. In some embodiments, controller 52 may transmit the input to visual alert element 56 upon a determination that a person has been detected in the imager field of view 72. In some embodiments, controller 52 may transmit the input only upon a determination that the obstruction is within a predetermined distance from vehicle and/or a determination that vehicle 10 is moving in a forward direction.

In some embodiments, visual alert may provide a steady light to alert a driver that an obstruction has been detected in the imager field of view 72, while in some embodiments, visual alert may provide a blinking alert to alert a driver that an obstruction has been detected in the imager field of view 72. In some embodiments, visual alert element 56 may be configured to blink faster for obstructions that are closer to vehicle 10 and blink slower for obstructions that are farther away from vehicle 10. In some embodiments, visual alert element 56 may be configured to blink at intervals based on the speed of vehicle 10, blinking faster upon the detection of an obstruction in the imager field of view 72 when the vehicle 10 is moving faster, and blinking slower when the vehicle 10 is moving slower or stopped.

Auditory alert element 60 may comprise a speaker or another device, such as a piezo electric element, configured to generate an auditory alert. Auditory alert element 60 may be configured to generate an auditory alert upon the receipt of an input from controller 52. In some embodiments, instructions from controller 52 may cause auditory alert element 60 to sound a louder alert for obstacles that are closer to vehicle 10 or for obstacles that have been in the imager field of view 72 for a predetermined amount of time.

User interface 64 may comprise at least one user input element 68. User input element 68 may comprise a physical button, a touch-sensitive button, a switch, and the like. Entering an input into user input element 68 may cause user interface 64 to transmit instructions to temporarily disable auditory alert element 60 and/or visual alert element 56. User interface 64 and user input element 68 may be located in any convenient location easily accessible to the driver, such as on a dashboard, on a center console, on a steering wheel, on a rearview assembly, and the like.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the warning system 40 may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. A warning system for a vehicle, comprising:

at least one imager disposed on a vehicle surface and configured to capture image data from a scene in a blind spot of a vehicle;

a processor in communication with the imager and configured to process the image data and determine whether there is an obstruction in the blind spot;

a controller in communication with the processor;

a user interface in communication with the controller and comprising at least one user input element; and at least one of an accelerometer in communication with the controller and a communication link between a bus of the vehicle and the controller;

wherein the controller is configured to determine whether the vehicle is moving in a forward direction based on an input received from one of the bus of the vehicle and the controller, wherein the processor is configured to determine a distance between a detected obstruction and the vehicle and to determine whether the obstruction is within a predetermined distance from the vehicle;

wherein the processor is configured to send, upon a determination that there is an obstruction in the blind spot within the predetermined distance from the vehicle, an appropriate input to the controller; and wherein the controller is configured to, upon receipt of both the input indicating that there is an obstruction in the blind spot within the predetermined distance from the vehicle and the receipt of an input indicating that the vehicle is moving in a forward direction, cause an alert to be generated.

2. The warning system of claim 1, wherein the controller is configured to cause the alert to be generated by at least one of a visual alert element and an auditory alert element.

3. The warning system of claim 2, wherein the controller is configured to enable the generation of the alert only when the vehicle speed is below a predetermined speed.

4. The warning system of claim 1, wherein the processor is configured to:

determine whether the obstruction in the blind spot is a person and, send the appropriate input to the controller only upon a determination that the obstruction within the blind spot and within the predetermined threshold distance is a person.

5. The warning system of claim 4, wherein the controller is configured to, upon receipt of the input indicating that there is a person in the blind spot, cause the alert to be generated by at least one of a visual alert element and an auditory alert element.

6. The warning system of claim 4, wherein the alert is a visual alert generated by the visual alert element; and wherein the visual alert element comprises a light source configured to illuminate a warning light within the vehicle, the warning light being dedicated solely to generating the alert.

7. The warning system of claim 4, wherein the inputs cause the generation of an auditory alert by the auditory alert element.

8. The warning system of claim 4, wherein, when an object is detected in a field of view of the imager, the warning system comprises both a visual alert element configured to activate a warning light within the vehicle and dedicated solely to generating the alert and a speaker configured to emit an audible signal upon receipt of an input from the controller indicating that the object has been detected in the field of view of the imager.

9. The warning system of claim 8, further comprising at least one of an accelerometer in communication with the controller and a communication link between a CAN bus of the vehicle and the controller;

wherein the controller is configured to determine whether the vehicle is moving in a forward direction.

10. The warning system of claim 8, wherein the warning system comprises a tiered series of alerts, with a first alert being generated upon the detection of an obstruction in the blind spot at a first point in time when the vehicle is moving in a forward direction.

11. The warning system of claim 10, wherein a second alert is generated at a second point in time later than the first point in time upon a determination that the vehicle is still moving; and wherein no second alert is generated at the second point in time if the vehicle has stopped moving in the forward direction.

12. The warning system of claim 1, wherein the controller is configured to, upon the receipt of a particular input from the user interface, selectively disable the generation of the alert.

13. The warning system of claim 1, wherein the warning system is configured to enable the generation of the alert only when the vehicle speed is below a predetermined speed.

14. The warning system of claim 6, wherein the dedicated light source is disposed in the interior of the vehicle on one of an A-pillar, an interior surface of a vehicle door, or a vehicle dashboard for illuminating a dedicated warning light disposed on the same one of the A pillar, the interior surface of the vehicle door, or the vehicle dashboard.

15. The warning system of claim 6, wherein the dedicated light source is one of two dedicated light sources positioned on respective ones of two vehicle A pillars.

16. The warning system of claim 6, wherein the controller further illuminates the dedicated warning light within the vehicle in intervals causing a blinking indication at a speed that varies in correspondence with the distance between the detected obstruction and the vehicle, as determined by the processor.

17. The warning system of claim 7, wherein the inputs cause the generation of an auditory alert by the auditory alert element at a volume level corresponding with the distance between the detected obstruction and the vehicle, as determined by the processor.

18. The warning system of claim 1, wherein the at least one imager comprises first and second imagers positioned within respective ones of an A pillar or a vehicle fender on respective first and second sides of the vehicle.

19. A warning system for a vehicle, comprising:

a first imager disposed on a first vehicle surface on a first side of the vehicle and positioned within one of a first vehicle A pillar or a first vehicle fender and configured to capture image data from a scene in a first forward blind spot of a vehicle;

a second imager disposed on a second vehicle surface on a second side of the vehicle and positioned within one of a second vehicle A pillar or a second vehicle fender and configured to capture image data from a scene in a second forward blind spot of the vehicle;

a processor in communication with the imager and configured to process the image data from the first and second imagers and determine whether there is an obstruction in one of the first blind spot and the second blind spot and to further determine if the object is a person;

a controller in communication with the processor; and at least one of an accelerometer in communication with the controller and a communication link between a bus of the vehicle and the controller;

wherein:

the controller is configured to determine whether the vehicle is moving in a forward direction based on an input received from one of the bus of the vehicle and the controller, the processor is configured to determine that there is an obstruction that is a person within one of the first blind spot and the second blind spot and within a predetermined distance from the vehicle and, upon such determination, send an appropriate input to the controller, and wherein the controller is configured to, upon receipt of the input indicating that there is an obstruction that is a person in one of the first blind spot and the second blind spot within the predetermined distance from the vehicle and the receipt of an input indicating that the vehicle is moving in a forward direction, cause an alert to be generated, and to ignore an obstruction that is not a person.

* * * * *